US010151177B2

(12) United States Patent
Kelly, III et al.

(10) Patent No.: US 10,151,177 B2
(45) Date of Patent: Dec. 11, 2018

(54) GRB

(71) Applicants: Arthur M. Kelly, III, Fort Worth, TX (US); Chance McMillan, Carlsbad, NM (US); Douglas R. Thompson, Carlsbad, NM (US); Ronald M. Crawford, Granbury, TX (US)

(72) Inventors: Arthur M. Kelly, III, Fort Worth, TX (US); Chance McMillan, Carlsbad, NM (US); Douglas R. Thompson, Carlsbad, NM (US); Ronald M. Crawford, Granbury, TX (US)

( * ) Notice: Subject to any disclaimer, the term of this patent is extended or adjusted under 35 U.S.C. 154(b) by 377 days.

(21) Appl. No.: 15/094,898

(22) Filed: Apr. 8, 2016

(65) Prior Publication Data

US 2017/0292348 A1 Oct. 12, 2017

(51) Int. Cl.
*E21B 41/00* (2006.01)
*F16K 17/02* (2006.01)

(52) U.S. Cl.
CPC .............. *E21B 41/00* (2013.01); *F16K 17/02* (2013.01)

(58) Field of Classification Search
CPC .................................. F16K 17/02; C10G 7/00
USPC .................. 166/68, 75.1, 75.12, 370; 95/15; 196/105, 136
See application file for complete search history.

(56) References Cited

U.S. PATENT DOCUMENTS

| | | | | | |
|---|---|---|---|---|---|
| 4,699,719 | A * | 10/1987 | Finley | B01D 17/0208 210/742 |
| 5,195,587 | A * | 3/1993 | Webb | E21B 43/34 137/172 |
| 7,350,581 | B2 * | 4/2008 | Wynn | E21B 43/34 166/370 |
| 8,206,124 | B1 * | 6/2012 | Varani | C10G 7/12 137/565.17 |
| 2013/0126155 | A1 * | 5/2013 | Fink | E21B 43/122 166/68 |
| 2015/0377000 | A1 * | 12/2015 | Bollingham | E21B 43/168 166/53 |

* cited by examiner

*Primary Examiner* — Nina Bhat
(74) *Attorney, Agent, or Firm* — The Iwashko Law Firm, PLLC; Lev Ivan Gabriel Iwashko

(57) ABSTRACT

An enclosure installed on oil well equipment to capture escaping gas emissions and recover them using intermittent use of a vapor recovery unit which evacuates the gas that slowly accumulates in the enclosure to a custody line for commercial or treatment elsewhere.

6 Claims, 8 Drawing Sheets

GRB

A. TECHNICAL FIELD OF THE INVENTION

Figure 1:
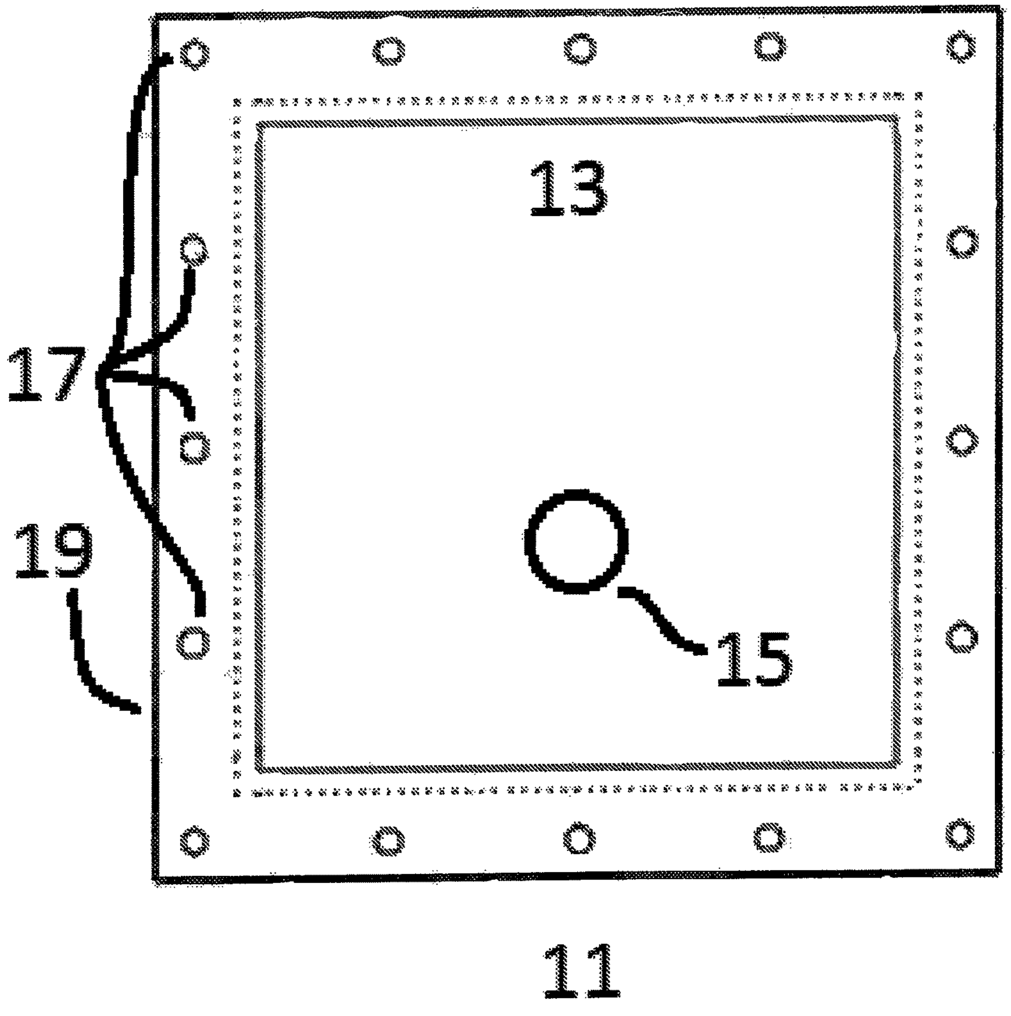

The invention pertains to the elimination of gases collected during the production oil drilling to prevent them from entering the atmosphere.

B. BACKGROUND OF THE INVENTION

The oil and natural gas industry includes a wide range of operations and equipment which includes the wells themselves, but also natural gas gathering lines, processing facilities, storage tanks, and transmission and distribution pipelines.

The industry is the largest source of emissions of volatile organic compounds (VOCs) which contribute to the formation of ground-level ozone and smog, both of which are linked to negative health effects, along with methane, benzene, ethyl benzene, and n-hexane. These greenhouse gases are disfavored by regulatory agencies for a number of reasons, not the least of these that they are suspected of causing serious negative health effects.

At one time, the oil and gas industry treated the elimination of gas as a non-issue, simply allowing gases to be expelled into the surrounding environment when they were not valuable enough to eagerly collect, or alternatively, to simply burn the gases.

However, times have changed and the regulatory scheme that controls drilling demands tight governance over escaping greenhouse gases. The United States Environmental Protection Agency (EPA) has addressed these gas emissions by slowly becoming more aggressive about enforcing regulations with the blessing of federal administrations in the last several years with a continuously revised set of rules known as the New Source Performance Standards.

The 2012 version of the NSPS requires that pneumatic controllers at oil and gas production facilities use low-bleed controllers, meaning that gas bleeds from the equipment at less than six standard cubic feet per hour (6 SCFH). The EPA is perpetually in the process of implementing even tighter controls.

Producers can expect the EPA's next enforced amendments to the NSPS to require all producers to have technology in service to eliminate the atmospheric expulsion of these gases. Combined with fees associated with the handling of greenhouse gases, citations, current service costs and lost profit, gas recovery is a highly sought technology in the oil and gas industry.

Most approaches to recovery of production gases merely focus on using better valves, all of which continue to allow a slow bleed of greenhouse emissions, from 100 to 200 mcf/year in practice. Moreover, any approaches that capture gases still require an operator to manually control the system. The oil industry needs to be able to more efficiently handle production gases so they can be eliminated and also recovered for commercial use.

C. SUMMARY OF THE INVENTION

The invention, known as a GRB (for 'gas recovery box') is an enclosure installed on oil well equipment to capture escaping gas emissions through intermittent automatic use of a vapor recovery unit (VRU) to reduce the buildup of those captured emissions, evacuating them to a custody line where they can be treated or used commercially.

D. BRIEF DESCRIPTION OF THE SEVERAL VIEWS OF THE DRAWING(S)

Exemplary embodiments of the GRB are set forth in the figures below.

Figure 2:
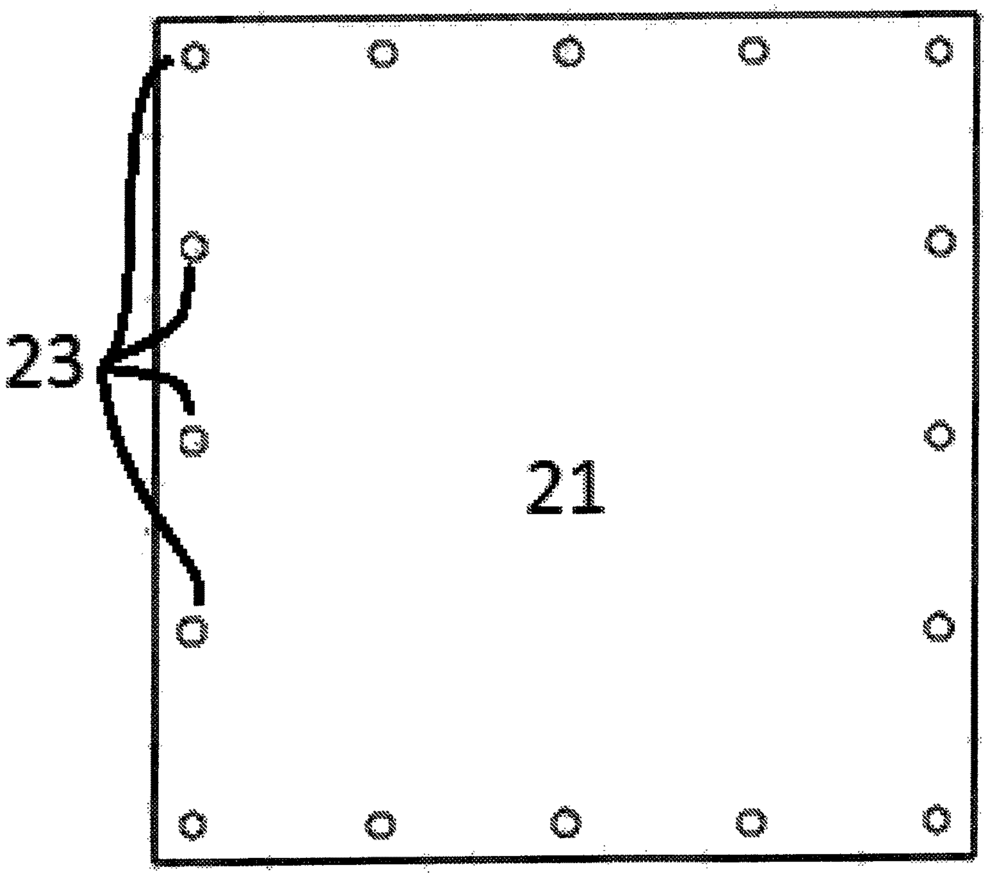
Figure 3:
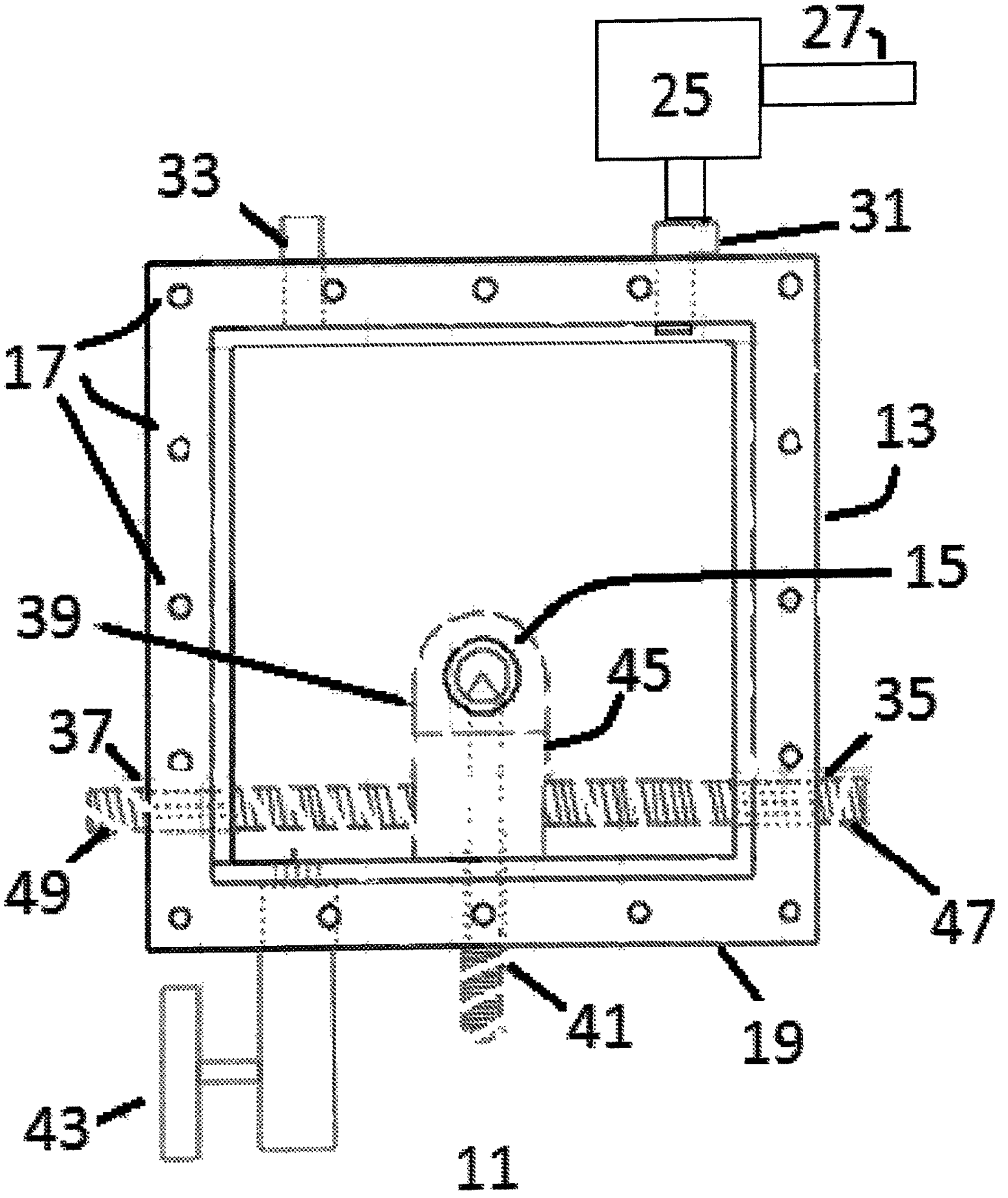
Figure 4:
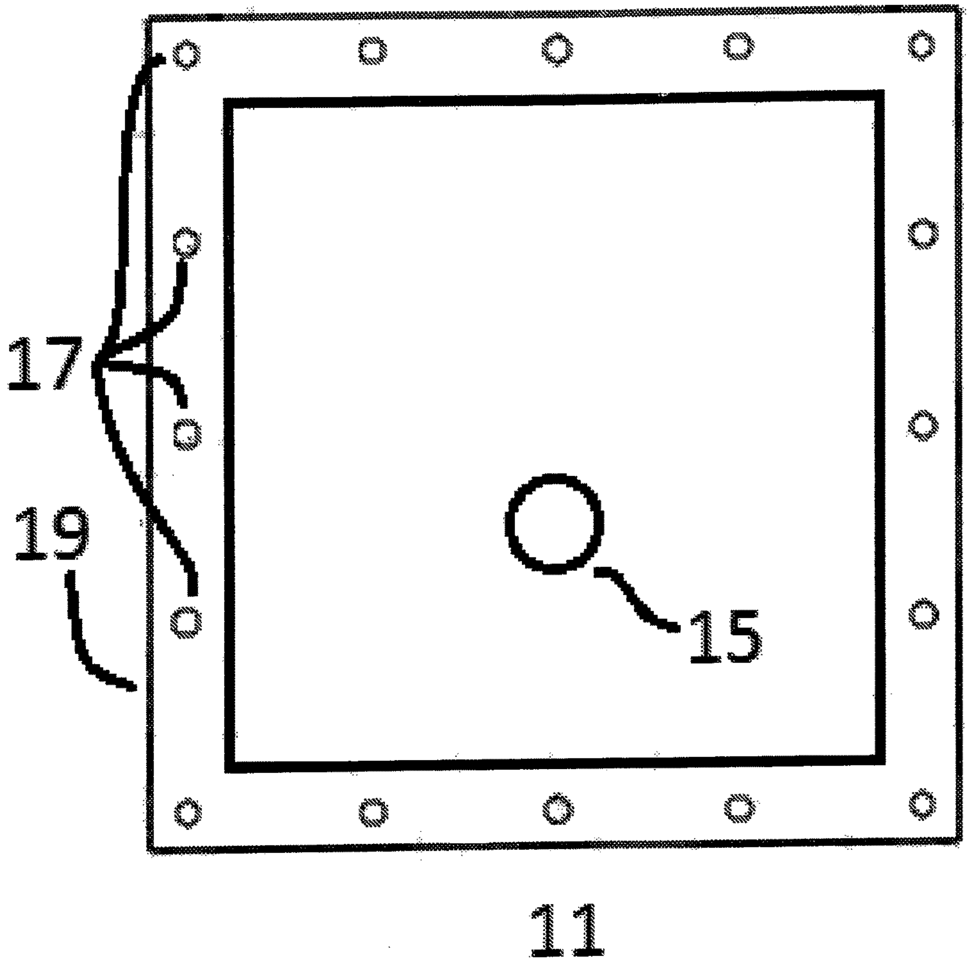
Figure 5:
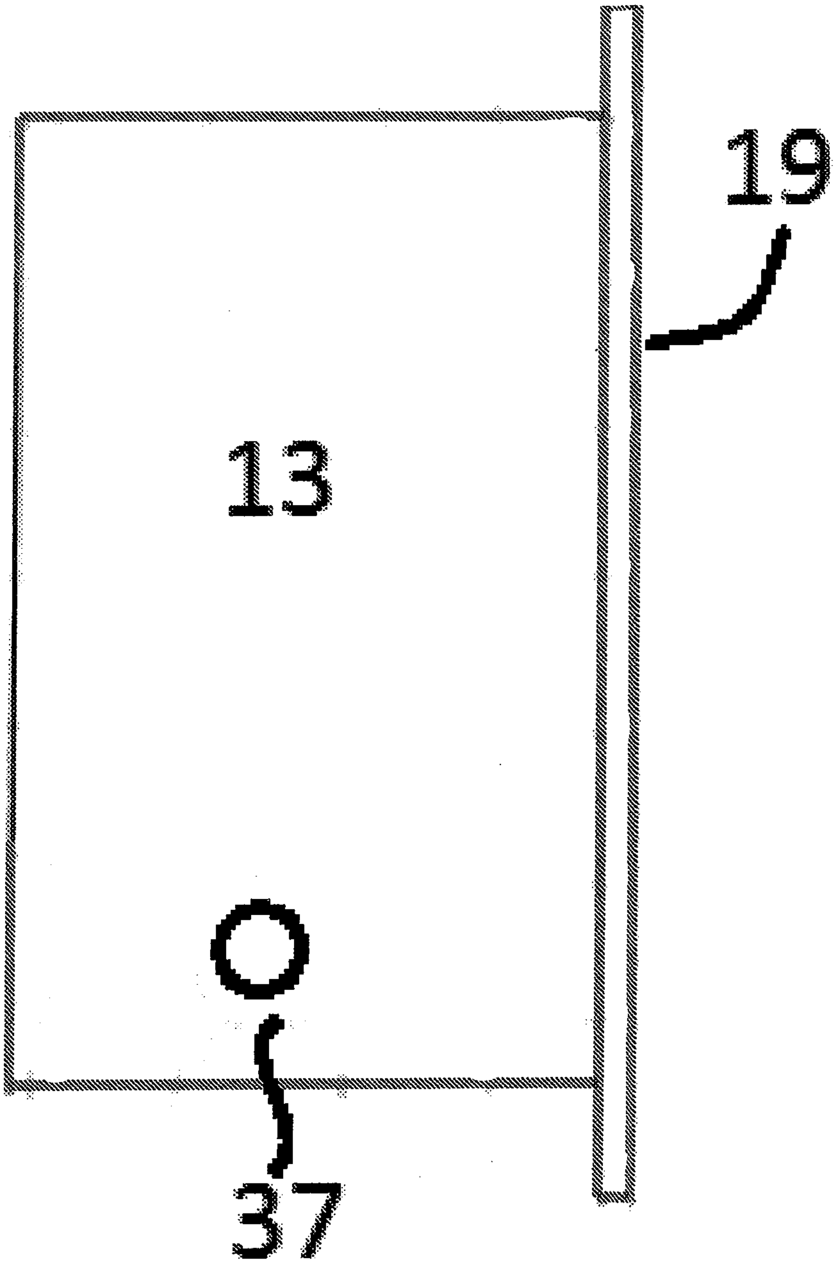
Figure 6:
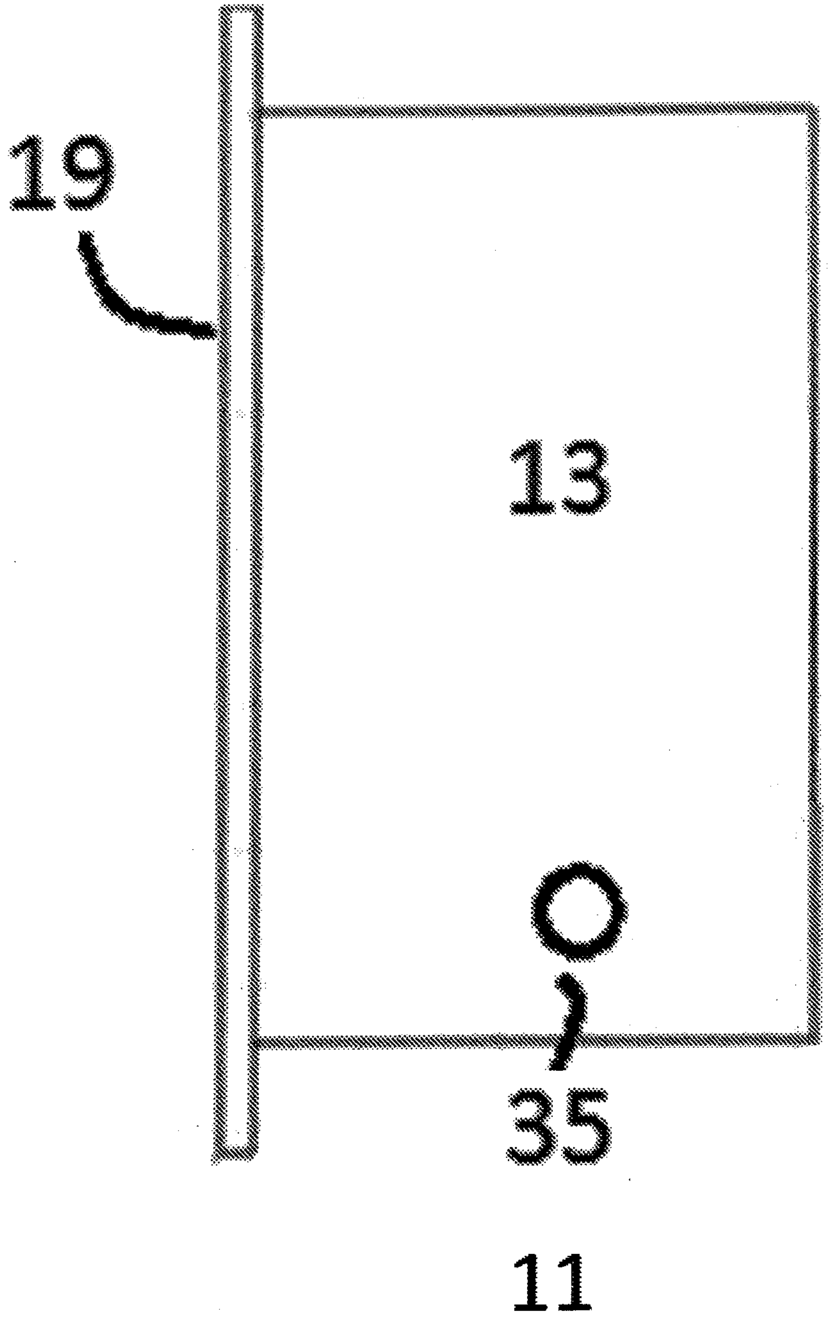
Figure 7:
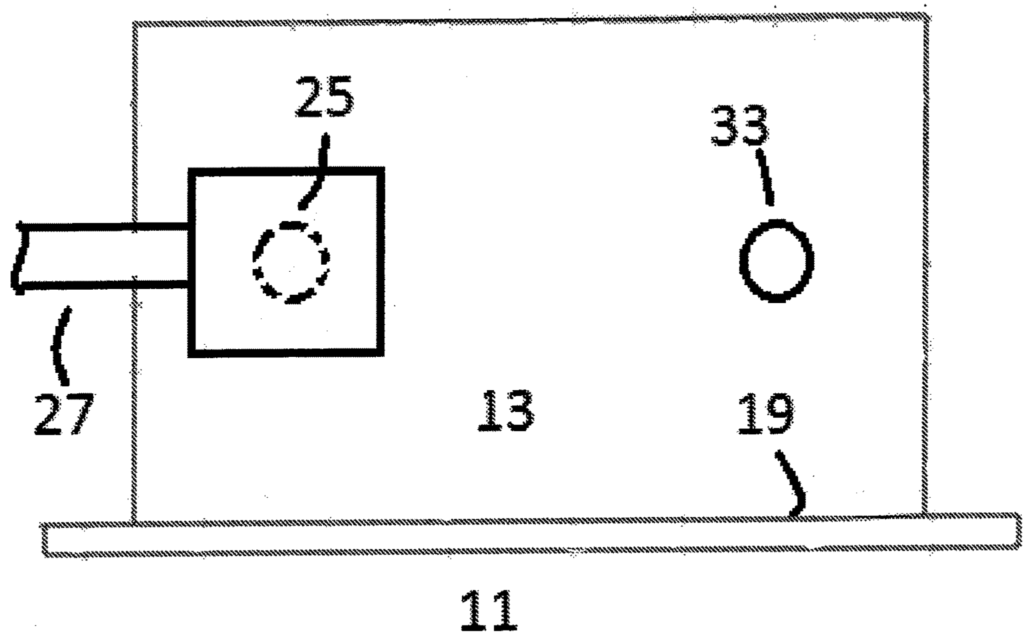
Figure 8:
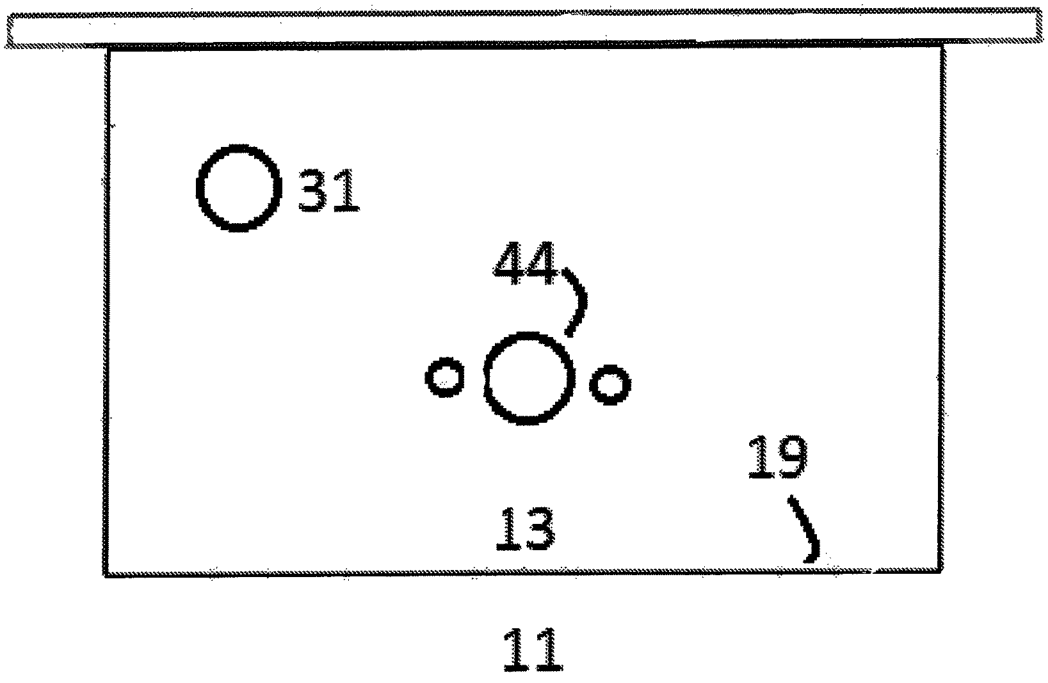

FIG. 1—Front view, without cover.
FIG. 2—Front cover.
FIG. 3—Front view, without cover, as installed.
FIG. 4—Back view of the GRB.
FIG. 5—Left view (output side) of the GRB.
FIG. 6—Right view (input side) of the GRB.
FIG. 7—Top view.
FIG. 8—Bottom view.

E. DETAILED DESCRIPTION OF THE INVENTION

For a better understanding of the disclosure and to show by way of example of the best embodiment currently known, reference is now made to the following detailed description along with the accompanying figures and corresponding parts.

Legend

No. Description:
11 GRB (the invention)
13 Shell
15 Tube Installation Hole
17 Front Cover Receiving Hole
19 Lip
21 Front Cover
23 Front Cover Mounting Hole
25 Vapor Recovery Unit
27 Custody Line
31 Exhaust Port
33 Pressure Relief Valve
35 Input Line Port
37 Output Line Port
39 Liquid Level Controller
41 Level Controller Adjustment Needle
43 Drain
44 Needle Valve Assembly Mounting Holes
45 Needle Valve Assembly
47 Input Line
49 Output Line As shown in the front view of FIG. 1, the GRB 11 is an enclosure which includes a Shell 13 which is open to the front and bound by a Mounting Lip 19.

In the Shell 13 of the GRB 11, FIG. 1 shows a tapped Tube Installation Hole 15 in the wall. In the embodiment discussed here, the GRB is mounted to existing equipment in at least three places—the Tube Installation Hole 15, the Input Line Port 35 and Output Line Port (see FIG. 3 for the latter two). Various equipment parts may have different hole patterns and sizes—the point is that all of the gas-emitting elements are enclosed by the GRB.

During installation, the Liquid Level Controller 39, the Level Controller Adjustment Needle 41, the Input Line 47 and Output Line 49 are disassembled, and the GRB 11 is installed so that the equipment is enclosed by the Shell 13 of the GRB 11, and when the Front Cover 21 is mounted onto the Shell 13, the resulting structure will restrain leaking greenhouse gases from leaking into the atmosphere.

In the embodiment show in the drawings, the Shell 13 and Front Cover 21 are attached by a set of Front Cover Receiving Holes 17 which extends around the Mounting Lip 19 of the Shell 13 and matches a set of Front Cover Mounting Holes 23 in the Front Cover 21. The invention can use any number of methods to affix the Front Cover 21 to the Shell 13. In this case, the two elements are held together by a bolt and nut assembly that requires no threading, but this is just one of many ways in which the structure could be created. The Front cover Receiving Holes 17 could be tapped, so bolts extended through the Front Cover Mounting Holes 23 of the Front Cover 21 and into the Receiving Holes 17, or the opposite construction could be used with a tapped construction of the Front Cover Mounting Hole 23. The figures show the hole pattern current used.

FIG. 3 shows a front view of the fully assembled GRB, showing how the GRB mounts around pre-existing structural elements in one embodiment, including the Input Line 47 which enters the Shell 13 through the Input Line Port 35, the Output Line 49 which leaves the Shell 13 through the Output Line Port 37, the Liquid Level Controller 39, and Adjustment Needle Assembly 45.

As also shown in FIG. 3, the Exhaust Port 31 leads to a Vapor Recovery Unit (VRU) 25, that discharges to a Custody Line (also known as a Supply Line) 27.

Though the VRU 25 shown in the figures is a small box, it is understood that vapor recovery units are of various sizes, shapes and constructions; the figures are drawn to merely show the existence of the VRU and its interconnection to the rest of the invention. The VRU 25 can be operated by battery, or by instrument air, external power, solar power, or a number of other sources.

When in operation, equipment inside the GRB slowly emits greenhouse gases. In this embodiment, the equipment is a Liquid Level Controller 41 and Needle Valve Assembly 45, but these are just examples.

As the installed equipment bleeds gases, the pressure inside the GRB 11 rises with respect to the atmosphere. When the pressure inside is at a six-ounce per square inch pressure relative to the atmosphere, the VRU 25 recognizes the pressure build-up and pulls the gases stored inside the GRB out to a Custody Line 27, where it can be treated for some internal use or sold on the market. When the pressure equalizes, the VRU 25 ceases to operate, and the pressure inside GRB 11 begins to rise anew.

Another useful element of the GRB is an optional Drain 43 in the base of the Shell 13, which allows a user to allow any collected liquids to be eliminated during routine maintenance.

To ensure that the GRB is functioning properly and handle emergency pressure scenarios, the Shell 13 includes an emergency Pressure Relieve Valve 33 (see FIG. 3) which will open the GRB and release enclosure pressure to the oil lines or dump lines at some preset pressure, typically 20-30 psi. This is the emergency release which only functions when the VRU fails to empty the GRB of pressure at the set pressure or some other equipment failure causing enclosure pressure to rise to an unacceptable level.

The applicant does not include the oil field equipment that emits green house gases as part of the invention, or any set construction based on particular equipment.

To reduce the greenhouse emissions of a producing well, a GRB should be installed on every point of gas emissions. A single production site may multiple GRBs to be installed on various pieces of equipment.

To install a GRB using the current embodiment, the user's instructions include the following details:

a) Shut down the supply pressure valve leading to the level controller or other equipment;
b) Bleed pressure off of the lines to which the controller is connected;
c) Unscrew the dart of the controller to prevent damaging the torque tube block;
d) Ensure that the GRB 11 is level and reassemble the level controller inside the GRB so it can maintain an air-tight seal sufficient to hold emitted gases inside the GRB. A gasket is currently used on the exterior of the GRB 11 to ensure a proper seal.
e) Reconnect supply and output lines to the GRB 11, hand-tighten external fittings to prevent cross-threading.
f) Connect supply and output connections to the Pressure Relief Valve 33.
g) Open supply valve to Input Line 47 and use external gauges as a guide to check the equipment installed in the GRB to ensure that the reassembled gear is properly functioning.
h) Connect the VRU 25 to the GRB 11 through the Exhaust Port 31 and Custody Line 27.
i) If desired, plumb the Pressure Relief Valve 33 to a low-pressure dump line.
j) Eliminate accumulated water in the GRB by opening the Drain 43 routinely.

The inventors claim:

1. An apparatus used to collect greenhouse gas as it escapes from oil field equipment, the apparatus comprising:
an enclosure which surrounds the oil field equipment to contain the greenhouse gas within the enclosure as the greenhouse gas escapes from the oil field equipment;
an exhaust port in the enclosure;
a vapor recovery unit attached at a first end to the exhaust port to transmit the greenhouse gas from the enclosure through the exhaust port such that the greenhouse gas travels to a custody line attached to the vapory recovery unit at a second end thereof, in response to an internal pressure of the enclosure reaching a predetermined set point.

2. The apparatus of claim 1, further comprising a drain port and valve in the bottom of the enclosure, placed to allow any liquid that has collected within the enclosure to be drained when the valve is opened.

3. The apparatus of claim 1, further comprising an emergency pressure relief valve that opens when the internal pressure of the enclosure reaches the predetermined set point.

4. The apparatus of claim 1, wherein the vapor recovery unit reduces the internal pressure of the enclosure when said pressure rises to six ounces per square inch of pressure by exhausting the gas through said gas port.

5. The apparatus of claim 1, wherein the vapor recovery unit deactivates when the internal pressure of the enclosure is at least two ounces per square inch of pressure.

6. The apparatus of claim 1, wherein the vapor recovery unit begins to operate when the internal pressure of the enclosure reaches six ounces per square inch of pressure and ceases operation when the internal pressure of the enclosure is reduced to at least two ounces per square inch of pressure, and while operating, moves gases that have accumulated in the enclosure to a custody line.

* * * * *